UNITED STATES PATENT OFFICE.

SMITH GARDNER, OF NEW YORK, N. Y.

IMPROVEMENT IN THE MANUFACTURE OF WHITE LEAD.

Specification forming part of Letters Patent No. 3,232, dated August 26, 1843.

*To all whom it may concern:*

Be it known that I, SMITH GARDNER, of the city of New York, in the State of New York, have invented an Improvement in the Process for Manufacturing White Lead—a pigment which is known to the chemist under the name of "carbonate of lead;" and I do hereby declare that the following is a full and exact description of my said improvement.

On the 28th day of August, in the year 1840, I obtained Letters Patent of the United States for an improvement in the process for manufacturing white lead, and since that period I have made a further improvement therein, by which I am enabled to employ a large proportionate quantity of litharge (or the protoxide of lead) in such manner as to convert the same into carbonate of lead of the best quality. In effecting this object I use triturating-vessels—such as referred to in the specification of the Letters Patent above named—in which to submit granulated metallic lead to attrition with water, proceeding in all respects in the ordinary mode of preparing the pulpy oxide or suboxide of lead. This triturating apparatus I use in the manner described by me in the specification herein referred to—that is to say, I construct the triturating-vessels in such manner as that they may be closed during the time of trituration—say for twelve hours, more or less—and that no other portion of atmospheric air or of carbonic acid shall be admitted into them than is necessary to the perfecting of the process, admitting the air or airs through a hollow gudgeon or in any other convenient manner, by which they are kept under the control of the operator. So far it will be seen that the procedure does not differ from that for which I obtained the above-named Letters Patent, in which it was my design to cause the carbonic acid to combine with the suboxide of lead in its nascent state.

In my improved process for converting the protoxide of lead into carbonate of lead I put into the triturating-vessel, along with the granulated or fragmentary lead which is to be converted into a pulpy oxide, a quantity of litharge, which may be equal in weight to that of the granulated lead, or it may, if desired, exceed this. I have sometimes used two hundred pounds of litharge with one hundred and fifty pounds of metallic lead with good results. The exact proportion therefore is not a thing of importance. I am of opinion, however, that when carbonic acid alone is to be introduced into the vessel during the time of trituration the weight of litharge ought not greatly to exceed that of the metallic lead, as this lead is oxidized principally or entirely at the expense of the protoxide, and it is probable that the suboxide, when perfectly formed, contains one-half the quantity of oxygen found in the protoxide; but this is a question of theory upon which I do not undertake to decide, its correctness not being necessary to the perfect success of the process, which has been experimentally proved.

I am aware that various attempts have been made to manufacture carbonate of lead from litharge; but until this was done by me in the manner herein described such attempts have resulted in the production of a very inferior article, while by my process it is obtained of the best quality and equal to that produced in my manufactory from the granulated lead alone, as described in my original patent.

In my former process it was necessary in all cases to admit a portion of atmospheric air with the carbonic acid, and the same may be done in my improved process in which litharge is used, but in much smaller proportionate quantities, and indeed the carbonic acid may be admitted alone or with no more atmospheric air mixed with it than will under ordinary circumstances be accidentally introduced.

Having thus fully pointed out the nature of my improvement in manufacturing white lead, what I claim therein as new, and desire to secure by Letters Patent, is—

The introduction of carbonic acid, or of carbonic acid in mixture with a portion of atmospheric air, into closed vessels in which fragments of metallic lead in mixture with litharge or protoxide of lead, in equal or varying proportions, are subjected to long-continued attrition in water, for the purpose and in the manner herein set forth.

SMITH GARDNER.

Witnesses:
C. M. OWEN,
ASA BUTLER.